UNITED STATES PATENT OFFICE.

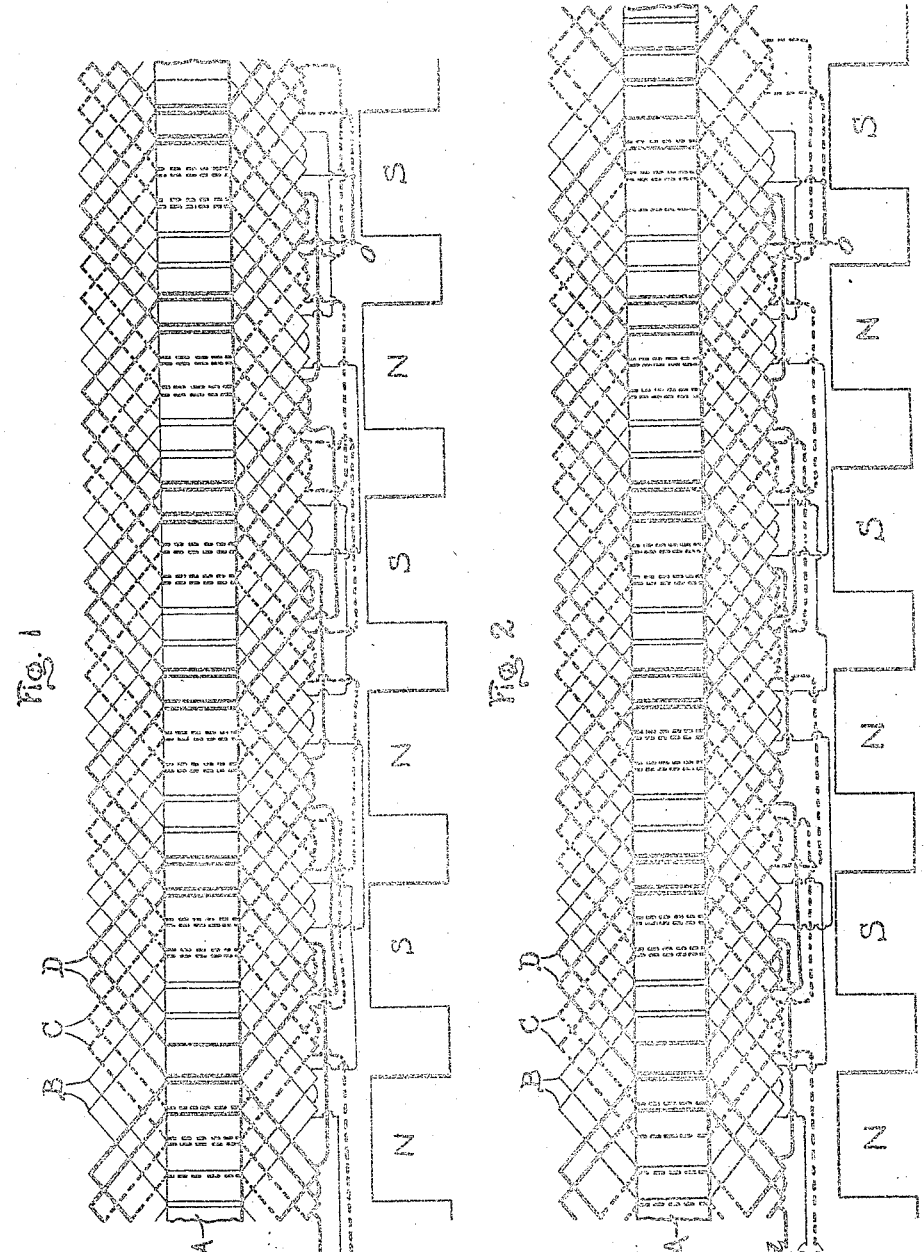

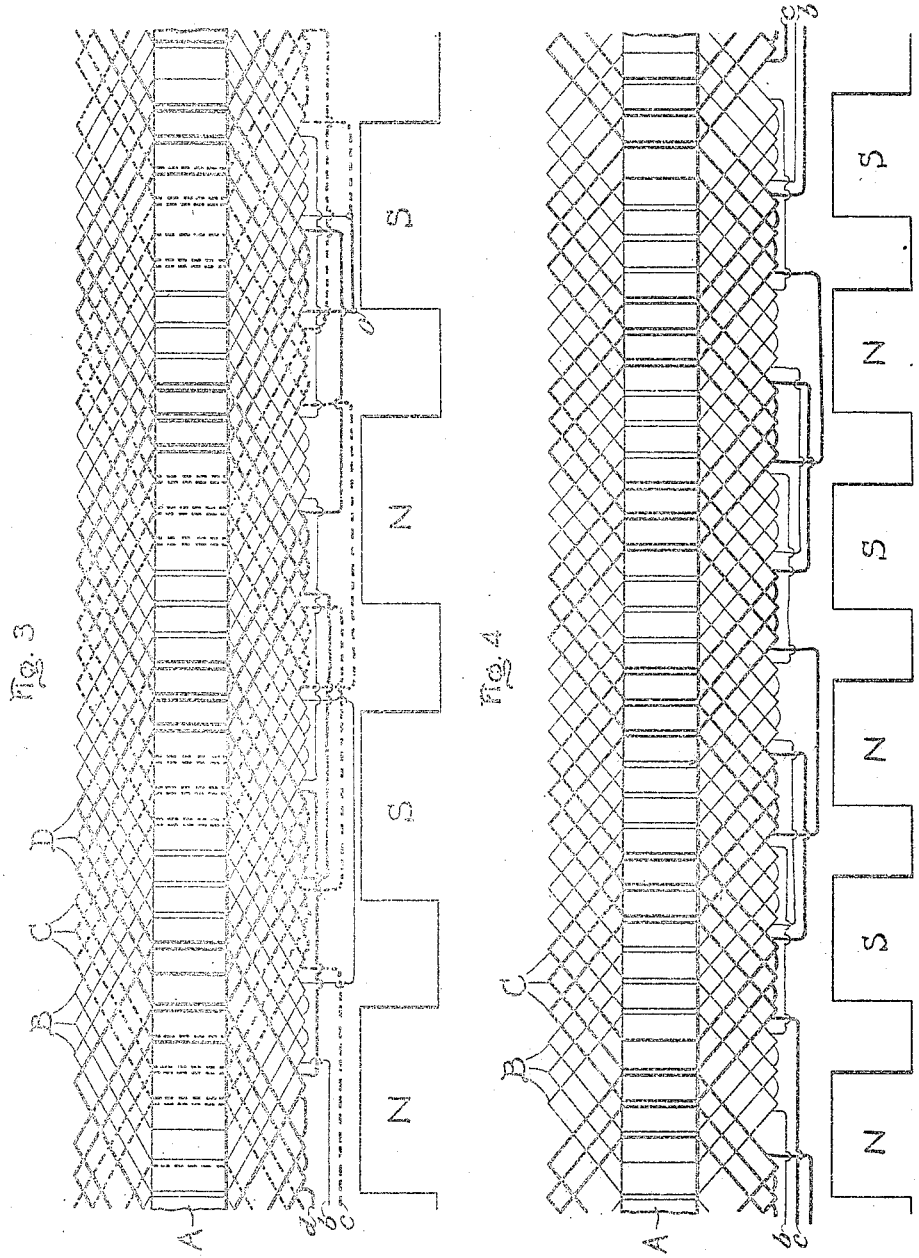

LAURENCE A. HAWKINS, OF SCHENECTADY, NEW YORK, ASSIGNOR TO GENERAL ELECTRIC COMPANY, A CORPORATION OF NEW YORK.

DYNAMO-ELECTRIC MACHINE.

953,202.

Specification of Letters Patent. Patented Mar. 29, 1910.

Application filed April 1, 1908. Serial No. 424,470.

*To all whom it may concern:*

Be it known that I, LAURENCE A. HAWKINS, a citizen of the United States, residing at Schenectady, in the county of Schenectady, State of New York, have invented certain new and useful Improvements in Dynamo-Electric Machines, of which the following is a specification.

My invention relates to synchronous alternating-current machines, and is particularly applicable to machines having stationary armatures in which the number of armature coils is ordinarily an exact multiple of the number of field poles, and its object is to provide a novel construction and winding arrangement, whereby the production of harmonics in the induced voltage of the machine is avoided.

If it were possible completely to distribute the armature winding of a machine, it would be easy to obtain a true sine wave, but in practice the armature coils are placed in slots, and the number of slots per pole is limited. The slots per pole must be divided between the several phases, so that the number of coils per phase per pole is small. In machines with a large number of poles the number of slots per pole per phase is usually two or three. This concentration of the winding is likely to result in pronounced harmonics in the wave of induced electromotive force, and if the circuit conditions are such as to accentuate the effect of the harmonics, they may create a disturbance on the system.

It has been proposed heretofore to obtain the effect of a more or less complete distribution of the armature winding by an unsymmetrical arrangement of the field poles, such that corresponding armature coils beneath adjacent poles do not lie in quite the same position with respect to those poles at the same instant. This construction, however, produces an unbalancing of the field magnet, both mechanically and magnetically.

By my invention I am enabled to obtain the same results without disturbing the symmetry of the field magnet. I accomplish this by providing a number of slots in the armature slightly in excess of that which would ordinarily be employed,—or, in other words, slightly in excess of the number required to receive the armature coils. If these slots are evenly spaced, it results that corresponding coils of the winding beneath adjacent poles are in somewhat different positions with respect to those poles at the same instant, precisely as though the field poles were shifted. It is not necessary to employ armature coils of different widths. On the contrary, the winding may be composed of form-wound coils, all of uniform pitch, as in a standard machine. Furthermore, by properly selecting the number of slots, and properly placing the coils in the slots, a symmetrical phase relation of the induced voltages in a polyphase machine may be obtained.

My invention will best be understood by reference to the accompanying drawings, in which—

Figure 1 shows a diagrammatic development of a machine arranged in accordance with my invention in its simplest form; Fig. 2 is a modification of the same, arranged to give a symmetrical phase relation of the voltages induced in the several phases of the winding; and Figs. 3 and 4 show the same principle applied to windings of different pole numbers and different numbers of phases.

In Fig. 1, N, S, etc., represent the poles of the field magnet, and A the laminated and slotted armature core, of a synchronous alternating-current machine. The core A is provided with a three-phase winding, the three-phases being represented by B, C and D. The coils of each phase are connected to each other in the usual manner, and the three phases may be connected in either Y or delta. In the drawing, the Y-connection is illustrated, the free terminals of the phases being indicated by $b$, $c$, $d$, respectively, and the common terminal or neutral by $o$. To assist in distinguishing the phases from each other, the coils composing them are indicated by different kinds of lines. The coils of the phase B are indicated by light full lines, the coils of phase C by dotted lines, and the coils of phase D by heavy full lines, 36 coils are shown, 12 coils per phase, and 2 coils per pole per phase; but the armature, instead of having 36 slots, which would be the usual number, has 37 slots. The result is that two of the slots are only half filled, each containing only one coil conductor or set of conductors, instead of two. Furthermore, the pitch of each coil is slightly less than the pole-pitch of the field-magnet, the coil pitch being 6 slots, and the pole-pitch being $6\frac{1}{6}$ slots. Consequently, corresponding coils of the same phase under different poles occupy slightly different positions with respect to those poles, so that when the 12 coils comprising each phase are considered in their relations to the several poles, it will be seen that there is an effect of a complete distribution of the coil conductors, so that an even wave of induced electromotive force, without harmonics, will be produced.

The arrangement shown in Fig. 1, while the preferable arrangement for a single-phase machine, is not the most advantageous for a polyphase machine, since the voltages of the phases B, C and D are not exactly 120° apart in phase. On the contrary, with such an arrangement as Fig. 1, there is a departure from an exact three-phase relation equal in degrees to 360 divided by the number of phases times the total number of slots. This product, in the case illustrated in Fig. 1, is $3 \times 37 = 111$, and 360 divided by this, equals approximately $3\frac{1}{4}°$. The voltages between phases B and C, consequently, instead of differing in phase exactly 120°, differ approximately 117°. There is the same phase difference between C and D, while between D and B, there is a difference of approximately 126°. It should be understood that this difference is greater than would occur in any commercial machine thus arranged, since for the sake of clearness of illustration a very small number of slots has been selected. In a three-phase machine of 20 poles and 2 coils per phase per pole, the number of slots would be 121, and the departure from a true three-phase relation would be less than 1°. If, however, the number of slots be properly chosen, and the coils be properly arranged in the slots, an exact three-phase relation may readily be obtained. Such an arrangement is shown in Fig. 2. In this figure the number of field-poles and the number of coils and phases are the same as in Fig. 1, but 39 slots are employed, instead of 37. Furthermore, while the winding of phase B is the same in Fig. 2 as in Fig. 1, the two right-hand coils of phase C in Fig. 2 are shifted one slot toward the right, while the two adjacent coils of phase D are shifted two slots toward the right, or what amounts to the same thing, looked at from the left-hand end of the figure, two coils of phase D are shifted each one slot to the left. That this coil arrangement gives a true three-phase relation of induced voltages, will be seen from the following consideration. Comparing phases B and C, it will be seen that each phase has 12 coils. The coils of phase B are all regularly arranged, and 10 coils of phase C are regularly arranged,—that is, each coil of phase C is displaced 2 slots from the corresponding coils of phase B. The two right-hand coils of phase C are, however, displaced 3 slots from the corresponding coils of phase B. The total displacement of phase C, with respect to phase B, may be summed up as follows,—10 coils displaced 2 slots = 20 coil-slots, plus 2 coils displaced 3 slots each = 6 coil-slots, making a total of 26 coil slots displacement. This number divided by 12, the number of coils, gives $\frac{13}{6}$ as the average coil displacement. Now the pitch of the field-poles is equal to the number of slots divided by the number of field poles,—that is, $\frac{39}{6}$ or $\frac{13}{2}$, and from this it is seen that the average coil displacement above given is exactly $\frac{1}{3}$ of the pitch of the field poles. In other words, the voltages induced in phases B and C are displaced from each other by 120°.

In order to determine the number of slots and the arrangement of the coils in them, the following formula may be employed. If the winding is of the two-coil per slot type shown, the number of slots equals $$CP + \frac{NPxy}{C},$$

in which C equals the number of coils per phase, P equals the number of phases, N equals the number of poles, $x$ equals the number of coils shifted with respect to the other coils of the phase, and $y$ equals the number of slots that those coils are shifted. $x$ and $y$ must be so chosen that the quantity in which they appear as factors may be a whole number. Applying this formula to Fig. 2, we have $$12 \times 3 + \frac{6 \times 3xy}{12}, \text{ or } 36 + \frac{3}{2}xy.$$

The values of $x$ and $y$ must, therefore, be such that their product is divisible by 2. Consequently, either $x$ or $y$ may be 1, and the other 2. In fact, the arrangement of Fig. 2 may be described by saying that two coils of phase C are shifted one slot, or that one coil is shifted two slots. Giving these values to $x$ and $y$ makes the total number of slots 39, as shown in the figure.

Fig. 3 shows a similar arrangement, the number of poles in this case being 4, the number of slots 35, and the number of phases 3, as before. This gives a pole-pitch of $8\frac{3}{4}$ slots per pole, and 3 coils per pole per phase. The average coil displacement between each of the phases is $\frac{35}{12}$ slots, one coil of phase C being shifted two slots to the right, and one coil of phase D, two slots to the left, to obtain this average coil displacement.

Fig. 4 shows my invention applied to a two-phase, six-pole machine having 18 coils per pole per phase, and 38 slots in the armature. The terminals of phase B are shown at $b$ $b$, and the terminals of phase C at $c$ $c$. 3 coils of phase C are shifted one slot to the right, or looking at it the other way, one coil is shifted 3 slots to the right, as viewed at the right-hand end of the figure. The average coil-displacement between the phases is $\frac{10}{6}$ slots, which is $\frac{1}{3}$ the pitch of the field poles, which is $\frac{3 \cdot 8}{6}$ or $\frac{10}{3}$ slots.

My invention is applicable to a machine of any number of phases and any number of coils per hole per phase, as well as to other types of winding than that shown in the drawings. Consequently, I do not desire to limit myself to the particular construction and arrangement of parts here shown, but aim in the appended claims to cover all modifications which are within the scope of my invention.

What I claim as new and desire to secure by Letters Patent of the United States, is—

1. A synchronous alternating-current machine, having a field magnet with evenly spaced poles, an armature core having evenly spaced slots in number indivisible by the number of field poles, and an armature winding comprising coils all of the same pitch carried in said slots, the number of armature coils being an exact multiple of the number of field poles.

2. A synchronous alternating-current machine, having a field magnet with evenly spaced poles, a slotted armature core, and an armature winding comprising coils of uniform pitch carried in the slots, the slots being evenly spaced and slightly greater in number than required to contain said coils.

3. A synchronous alternating-current machine, having a field magnet with evenly spaced poles, a slotted armature core, and an armature winding comprising coils of uniform pitch carried in the slots, the slots being evenly spaced and the number of slots per pole being an integer plus a fraction, the number of armature coils being an exact multiple of the number of field poles.

4. A synchronous alternating-current machine, having a field magnet with evenly spaced poles, a slotted armature core, and a polyphase armature winding composed of coils of uniform pitch carried in the slots, the slots being evenly spaced and slightly greater in number than required to contain said coils and certain of the coils of certain of the phases being shifted so as to give the desired phase relation between the voltages induced in the phases of the armature winding.

5. A synchronous alternating-current machine, having a field magnet with evenly spaced poles, an armature core having evenly spaced slots in number indivisible by the number of field poles, and armature coils all of the same pitch carried in said slots and connected in a plurality of phases, certain of the coils of certain of the phases being shifted so as to give the desired phase relation between the voltages induced in the phases of the armature winding.

6. A synchronous alternating-current machine, having a field magnet with evenly spaced poles, an armature core having evenly spaced slots in number indivisible by the number of poles, and an armature winding comprising coils carried in but not entirely filling all of said slots.

7. A synchronous alternating-current machine, having a field magnet with evenly spaced poles, an armature core having uniformly spaced slots, and an armature winding comprising coils carried in said slots, the number of coils being a multiple of the number of field poles and the number of slots being slightly greater than required to contain said coils.

In witness whereof, I have hereunto set my hand this 31st day of March, 1908.

LAURENCE A. HAWKINS.

Witnesses:
  HEWLETT SCUDDER, Jr.,
  HELEN ORFORD.